United States Patent Office 2,962,500
Patented Nov. 29, 1960

2,962,500
NEW ALKYL-PIPERIDINES

Karl Hoffmann, Binningen, and Ernst Sury, Basel, Switzerland, assignors to Ciba Pharmaceutical Products, Inc., Summit, N.J.

No Drawing. Filed July 14, 1958, Ser. No. 748,157

Claims priority, application Switzerland Aug. 12, 1957

9 Claims. (Cl. 260—293)

This invention relates to new alkyl-piperidines of the formula

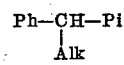

in which Ph represents a phenyl radical, Pi represents a piperidyl radical, and Alk an alkyl group containing at least 10 carbon atoms, and also salts and quaternary lower alkyl ammonium compounds thereof.

The new alkyl-piperidines may contain substituents in the rings, for example, the phenyl radical may contain halogen atoms, alkyl groups, free or substituted hydroxyl groups, such as alkoxy groups, nitro groups or amino groups. The piperidyl-radical, which may be bound to the remainder of the molecule in the 2-, 3- or 4-position, may be substituted especially at the nitrogen atom. As substituents there may be mentioned more especially, lower alkyl groups, such as methyl, ethyl or propyl, or lower hydroxy-, halogen- or amino-alkyl groups, and preferably -ethyl or -propyl groups such as oxy-ethyl, halogen-ethyl or aminoethyl groups. Halogen atoms are more especially chlorine, bromine or iodine, and the amino group is preferably disubstituted by lower aliphatic groups and may therefore be, for example, a lower dialkylamino group, such as the dimethylamino or diethylamino group, or a lower alkylene-amino group of which the alkylene radical may be interrupted by hetero atoms, such as nitrogen or oxygen, for example, the piperidino, pyrrolidino or morpholino group.

Quaternary lower alkyl ammonium compounds are preferably those in which lower alkyl is methyl, ethyl, propyl.

The new compounds possess valuable properties. Thus, they possess an antibacterial action, for example, against *Staphylococcus aureus,* and against fungi, for example, *Microsporum audouini* and *Trichophyton interdigitalis,* and soor, and are therefore useful as disinfecting or preserving agents or medicaments.

Especially valuable in this respect are the compounds of the formula

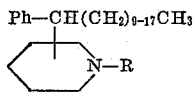

in which Ph has the meaning given above, and R represents hydrogen or a methyl group, and also salts and especially quaternary lower alkyl-ammonium compounds thereof, which are distinguished by being resistant to soap and serum. There may be mentioned more especially the compounds of the formulae

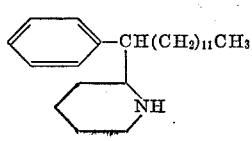

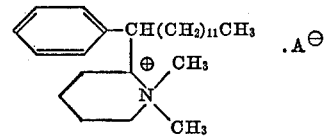

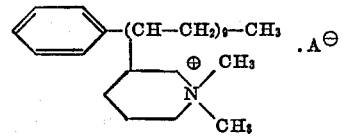

and

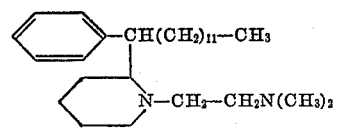

in which A represents an anion, for example, a halogen atom such as bromine or iodine or a sulfuric or sulfonic acid radical.

The new compounds are made by methods in themselves known, thus, an alkyl-pyridine of the formula

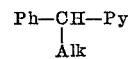

in which Ph and Alk have the meanings given above, and Py represents a pyridyl radical, may be treated with a hydrogenating agent.

The hydrogenation may be carried out with an agent known to be capable of hydrogenating a pyridine ring. Thus, for example, the hydrogenation may be carried out with hydrogen in the presence of a catalyst, especially a noble metal catalyst, such as platinum or palladium, or in the presence of nickel or copper chromite.

In another process a compound of the formula

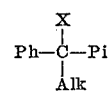

in which Ph, Alk and Pi have the meanings given above, and X represents a substituent exchangeabale for hydrogen, is treated to exchange X for hydrogen.

Substituents exchangeable for hydrogen are, for example, free, esterified or etherified hydroxyl groups or free or functionally converted carboxyl groups. These groups may be exchanged for hydrogen by methods in themselves known. Thus, a free, etherified or esterified hydroxyl group may be exchanged directly for hydrogen or indirectly, for example, by splitting it off with the formation of a double bond and hydrogenating the unsaturated compound. For example, a compound containing a free, esterified or etherified hydroxyl group may be treated with nascent or catalytically activated hydrogen. In a compound containing an esterified hydroxyl group, such as a hydroxyl group esterified with a hydrohalic acid or an organic sulfonic acid, the esterified hydroxyl group may be exchanged for hydrogen by treatment with a complex metal hydride, such as lithium-aluminum hydride. Starting materials containing a functionally converted carboxyl group are advantageously converted into the free acids, and the latter decarboxylated, for example, by heat. Those starting materials that are not known can be made by hydrogenating pyridine compounds which are substituted in the 2-position in the manner indicated above for the starting materials. The starting materials may also be formed during the reaction.

Thus, for example, an appropriate pyridine, which contains in the 2-position a radical of the formula

can be converted directly into the desired final product by treatment with a reducing agent.

Secondary alkyl-piperidines obtained by the process may be converted by methods in themselves known into the corresponding tertiary compounds. For example, they may be alkylated in the usual manner, or, for example, converted into the corresponding tertiary oxyalkyl derivatives by treatment with a 1:2-alkylene oxide, from which tertiary derivatives the corresponding halogen-alkyl derivatives can be obtained by treatment with a halogenating agent, for example, thionyl chloride or phosphorus oxychloride. These halogen-alkyl derivatives may in turn be converted into the corresponding amino-alkyl compounds by treatment with amines.

Tertiary amino-compounds obtained by the process may be quaternated in the usual manner. For this purpose there is preferably used a reactive ester of a lower alkanol such as an ester thereof with a strong inorganic or organic acid, for example, a hydrohalic acid, sulfuric acid or an aryl-sulfonic acid.

Depending on the procedure used the new compounds are obtained in the form of the free bases or salts thereof. From the salts of the amines and quaternary ammonium bases the free bases may be obtained by methods in themselves known. From the free bases salts may be obtained by reaction with acids suitable for forming industrially or therapeutically useful salts, for example, hydrohalic acids, sulfuric acid, nitric acid, phosphoric acid, thiocyanic acid, acetic acid, propionic acid, oxalic acid, malonic acid, succinic acid, malic aid, methane sulfonic acid, ethane sulfonic acid, oxyethane sulfonic acid, benzene or toluene sulfonic acid, salicylic acid or similar acids.

The new compounds conatin two asymmetric carbon atoms, and can therefore be obtained in the form of racemate mixtures. The latter can be separated by the usual methods, such as crystallization. The individual racemates can be split up by the usual methods into their optically active antipodes.

The invention also includes any modification of the process in which there is used as starting material a compound obtainable as an intermediate product at any stage of the process and the remaining steps of the process are carried out, or in which the process is interrupted at any stage, and the invention also includes intermediate products obtainable in this manner.

The starting materials are known or can be made by methods in themselves known.

The new compounds can be used in diseases caused by bacteria and fungi especially against soor in the form of industrial or pharmaceutical preparations which contain the new compound in admixture with a suitable carrier or diluent. As pharmaceutical carriers there are used substances which do not react with the new compounds, for example, water, gelatine, lactose, starches, magnesium stearate, talc, vegetable oils, benzyl alcohols, gums, polyalkylene glycols, white petroleum jelly, cholesterol or other known carriers for medicaments. The pharmaceutical preparations may be, for example, in the form of tablets, dragees, powders, salves, creams, suppositories or in liquid form as solutions, suspensions or emulsions. If desired, they may be sterilized and/or may contain auxiliary substances, such as preserving, stabilizing, wetting or emulsifying agents. They may also contain other therapeutically valuable substances.

The new compounds are also suitable as disinfecting or preserving agents, for example, for disinfecting the skin, for example, the hands or instruments, or laundry goods or the like, and also for disinfecting or preserving nutrient materials or feeding stuffs. They may be used alone or in admixture with one another in solution or as emulsions and/or with other active or inactive substances, such as salves or in the form of dry powders.

The following examples illustrate the invention:

Example 1

A solution of 33.7 grams of 2-[1′-phenyl-tridecyl-(1′)]-pyridine in 120 cc. of glacial acetic acid is agitated with 1 gram of platinum oxide in an atmosphere of hydrogen at 25° C. When the theoretical quantity of hydrogen has been absorbed, the catalyst is filtered off, the solution is evaporated, the residue is dissolved in water, the solution is rendered alkaline with caustic soda solution, and the oil which separates is extracted with ether. After evaporating the solvent there remains behind 2-[1′-phenyl-tridecyl-(1′)]-piperidine of the formula

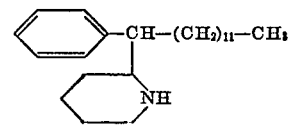

in the form of an oil which boils at 169–176° C. under 0.09 mm. pressure. The base dissolves in dilute hydrochloric acid to form the hydrochloride.

The starting material mentioned above can be obtained by condensing 50 grams of phenyl-pyridyl-(2)-acetonitrile, 11 grams of sodamide and 68 grams of lauryl bromide in 200 cc. of dioxane, followed by hydrolysis and decarboxylation with sodium hydroxide or potassium hydroxide at 220° C. The resulting 2-[1′-phenyl-tridecyl-(1′)]-pyridine boils at 169–171° C. under 0.05 mm. pressure.

Example 2

2-[1′-phenyl-tridecyl-(1′)]-pyridine methosulfate, obtained by boiling for one hour under reflux 100 grams of 2-[1′-phenyl-tridecyl-(1′)]-pyridine with 42 grams of dimethylsulfate in 300 cc. of ethyl acetate followed by evaporation of the solvent in vacuo, is dissolved in 250 cc. of ethanol and reduced with hydrogen at 25° C. with the aid of 5 grams of platinum oxide. When the calculated quantity of hydrogen has been absorbed, the catalyst is filtered off, the solvent is evaporated, the residue is dissolved in water, the solution is rendered alkaline with caustic soda solution, and the liberated base is extracted with ether.

Upon evaporating the solvent there remains behind 2-[1′-phenyl-tridecyl-(1′)]-N-methyl-piperidine of the formula

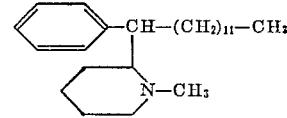

in the form of an oil boiling at 175–177° C. under 0.08 mm. pressure.

Example 3

18 grams of 2-[1′-phenyl-tridecyl-(1′)] - N - methyl-piperidine obtainable as described in Example 2, dissolved in 80 cc. of ethyl acetate, are boiled under reflux with 9 grams of methyl iodide for 10 minutes. The mixture is then strongly concentrated and the residue is mixed with ether. The iodomethylate of 2-[1′-phenyl-tridecyl-(1′)]-N-methyl-piperidine crystallizes in handsome lamellae melting at 139–140° C. It has the formula

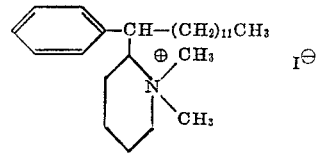

Example 4

80 grams of 2-[1'-phenyl-tridecyl-(1')]-piperidine obtained as described in Example 1 are dissolved in 250 cc. of ethanol containing 16 grams of ethylene oxide, and the solution is whirled round for 20 hours at 25–30° C. After removing the solvent, the residue is distilled whereby 2-[1'-phenyl-tridecyl-(1')]-N-(β-oxyethyl)-piperidine of the formula

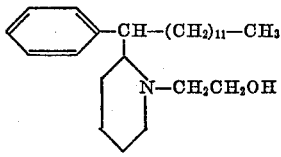

passes over at 196–197° C. under 0.09 mm. pressure in the form of a colorless oil.

Example 5

A solution of 7 grams of thionyl chloride and 20.5 grams of the 2-[1'-phenyl-tridecyl-(1')]-N-(β-oxyethyl)-piperidine in 100 cc. of absolute chloroform is allowed to stand for 20 hours at 25° C., and then the solvent is removed in vacuo. The residue, consisting of 2-[1'-phenyl-tridecyl-(1')]-N-(β-chlorethyl)-piperidine, is dissolved in 150 cc. of benzene and boiled with a benzolic solution of 12 grams of dimethylamine for one hour under reflux. After cooling the mixture, it is diluted with ether, the organic layer is washed with water, the solvent is evaporated, and the residue is distilled in a high vacuum. The resulting 2-[1'-phenyl-tridecyl-(1')]-N-(β-dimethylaminoethyl)-piperidine of the formula

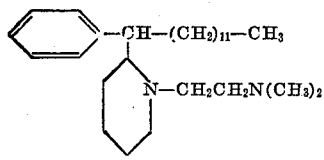

boils at 189–192° C. under 0.08 mm. pressure.

Example 6

In a manner analogous to that described in Example 1 the following compounds are obtained:

| | Boiling at— |
|---|---|
| 2-[1'-phenyl-undecyl-(1')]-piperidine | 157–158° C. (1.1 mm.). |
| 2-[1'-phenyl-pentadecyl-(1')]-piperidine | 201–203° C. (0.1 mm.). |
| 2-[1'-phenyl-heptadecyl-(1')]-piperidine | 224–229° C. (0.28 mm.). |
| 2-[1'-phenyl-nonadecyl-(1')]-piperidine | 211–217° C. (0.1 mm.). |
| 2-[1'-para-chlorophenyl-tridecyl-(1')]-piperidine | 185–192° C. (0.1 mm.). |
| 2-[1'-ortho:para-dichlorophenyl-tridecyl-(1')]-piperidine | 190–201° C. (0.1 mm.). |
| 2-[1'-para-tert.-butyl-phenyl-tridecyl-(1')]-piperidine | 202–205° C. (0.1 mm.). |

In a manner analogous to that described in Example 2 the following compounds are obtained:

| | Boiling at— |
|---|---|
| 2-[1'-phenyl-undecyl-(1')]-N-methyl-piperidine | 157–159° C.(0.1 mm.). |
| 2-[1'-phenyl-pentadecyl-(1')]-N-piperidine | 190–192° C. (0.1 mm.). |
| 2-[1'-phenyl-heptadecyl-(1')]-N-methyl-piperidine | 196–199° C. (0.09 mm.). |
| 2-[1'-phenyl-nonadecyl-(1')]-N-methyl-piperidine | 206–209° C. (0.09 mm.). |
| 2-[1'-para-chlorophenyl-tridecyl-(1')]-N-methyl-piperidine | 197–201° C. (0.1 mm.). |
| 2-[1'-ortho:para-dichlorophenyl-tridecyl-(1')]-N-methyl-piperidine | 205–212° C. (0.12 mm.). |
| 2-[1'-para-tert.-butyl-phenyl-tridecyl-(1')]-N-methyl-piperidine | 202–206° C. (0.1 mm.). |
| 4-[1'-phenyl-undecyl-(1')]-N-methyl-piperidine | 172–175° C. (0.1 mm.). |

In a manner analogous to that described in Example 3 the following compounds are obtained:

| | Melting at— |
|---|---|
| 2-[1'-phenyl-undecyl-(1')]-N-methyl-piperidine-iodomethylate | Very hygroscopic crystals. |
| 2-[1'-phenyl-pentadecyl-(1')]-N-methyl-piperidine-iodomethylate | 139–140° C. |
| 2-[1'-phenyl-heptadecyl-(1')]-N-methyl-piperidine-iodomethylate | 142–143° C. |
| 2-[1'-phenyl-nonadecyl-(1')]-N-methyl-piperidine-iodomethylate | 141–142° C. |
| 2-[1'-para-chlorophenyl-undecyl-(1')]-N-methyl-piperidine-iodomethylate | Very hygroscopic crystals. |
| 2-[1'-ortho:para-dichlorophenyl-undecyl-(1')]-N-methyl-piperidine-iodomethylate | Do. |
| 2-[1'-para-tert.-butyl-phenyl-undecyl-(1')]-N-methyl-piperidine-iodomethylate | Do. |
| 4-[1'-phenyl-undecyl-(1')]-N-methyl-piperidine-iodomethylate | 104–105° C. |

In a manner analogous to that described in Example 4 the following compounds are obtained:

| | Boiling at— |
|---|---|
| 2-[1'-phenyl-undecyl-(1')]-N-(β-oxyethyl)-piperidine | 190–192° C. (0.1 mm.). |
| 2-[1'-phenyl-pentadecyl-(1')]-N-(β-oxyethyl)-piperidine | 203–209° C. (0.05 mm.). |
| 2-[1'-phenyl-heptadecyl-(1')]-N-(β-oxyethyl)-piperidine | 225–235° C. (0.1 mm.). |
| 2-[1'-phenyl-nonadecyl-(1')]-N-(β-oxyethyl)-piperidine | 230–231° C. (0.1 mm.). |
| 3-[1'-phenyl-tridecyl-(1')]-N-(β-oxyethyl)-piperidine | 216–220° C. (0.1 mm.). | and in a manner analogous to that described in Example 5 the following compounds are obtained:

| | Boiling at— |
|---|---|
| 2-[1'-phenyl-undecyl-(1')]-N-(β-dimethylamino-ethyl)-piperidine | 187–188° C. (0.1 mm.). |
| 2-[1'-phenyl-pentadecyl-(1')][-N-(β-di-methylamino-ethyl)-piperidine | 209–211° C. (0.08 mm.). |
| 2-[1'-phenyl-nonadecyl-(1')]-N-(β-dimethylamino-ethyl)-piperidine | 234–236° C. (0.08 mm.). |

Example 7

15 grams of 2-[1'-phenyl-1'-hydroxy-tridecyl-(1')]-piperidine are boiled for 4 hours at 150–160° C. with 200 grams of sulfuric acid of 75% strength, and then a mixture is poured into ice, rendered alkaline with caustic soda solution, and the oily layer is extracted with ether. After washing the ethereal extract to neutral, it is dried over potassium carbonate, the ether is evaporated, and the residue is distilled in a high vacuum. There is obtained 2-[1'-phenyl-tridecylidene-(1')]-piperidine of the formula

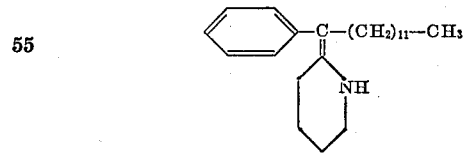

boiling at 183–188° C. under 0.1 mm. pressure.

6 grams of 2-[1'-phenyl-tridecylidene-(1')]-piperidine, dissolved in 50 cc. of alcohol, are hydrogenated with the aid of 0.5 gram of platinum oxide at 25° C. Upon removing the catalyst and evaporating the solvent, there is obtained 2-[1'-phenyl-tridecyl-(1')]-piperidine described in Example 1.

The starting material used above may be prepared as follows:

36 grams of 2-benzoyl-pyridine dissolved in 100 cc. of absolute ether are added dropwise to a Grignard solution of 50 grams of lauryl bromide, 4.9 grams of magnesium shavings and 350 cc. of absolute ether at −10° C. to 0° C., while stirring. The whole is then stirred for a further hour at 25° C. and for 2 hours at 45° C. The reaction product is poured into dilute hydrochloric acid and ice and extracted with ether, the ethereal extract is washed with water, and dried over potassium carbonate. After evaporating the solvent, there remains behind 2-[1'-phenyl-1'-hydroxy-tridecyl-(1')]-pyridine, which boils at 195–198° C. under 0.1 mm. pressure.

The latter product is dissolved in 200 cc. of glacial acetic acid and hydrogenated with the aid of 2 grams of platinum oxide and hydrogen at 50° C. to form the above-mentioned 2 - [1'-phenyl-1'-hydroxy-tridecyl-(1')]-piperidine, which boils at 186–192° C. under 0.1 mm. pressure.

The following compounds are obtained in a manner analogous to that described:

|  | Boiling at— |
|---|---|
| 3-[1'-phenyl-tridecyl-(1')]-piperidine | 188–195° C. (0.1 mm.). |
| 4-[1'-phenyl-tridecyl-(1')]-piperidine | 200–202° C. (0.1 mm.). |

Example 8

20 grams of sodium are added in portions to a solution of 10 grams of 2-[1'-phenyl-1'-hydroxy-tridecyl-(1')]-piperidine in 200 cc. of butanol, and the whole is stirred at the boil until all the metal has been consumed. The mixture is acidified with hydrochloric acid, the butanol is evaporated in vacuo, the residue is rendered alkaline with caustic soda solution, the precipitated oil is extracted with ether, the ethereal extract is washed with water and dried over potassium carbonate. By evaporating the solvent there is obtained 2-[1'-phenyl-tridecyl-(1')]-piperidine described in Example 1.

Example 9

15 grams of 2-[1'-phenyl-1'-carbamyl-tridecyl-(1')]-piperidine are heated for 4 hours at 150° C. with 60 cc. of sulfuric acid of 80% strength. After diluting the mixture with ice, sodium hydroxide solution is added until the reaction is alkaline, and the precipitating oil is then extracted with ether. After purifying and drying the ethereal solution, the solvent is evaporated, whereupon the residue is distilled. 8.5 grams of an oil are obtained which distills at 170–174° C. under 0.1 mm. pressure and is identical with 2-[1'-phenyl-tridecyl-(1')]-piperidine described in Example 1.

The above starting material is obtained by subjecting the starting material, 2-[1'-phenyl-1'-cyano-tridecyl-(1')]-pyridine, mentioned in Example 1 to the action of concentrated sulfuric acid, and the carbamyl compound to catalytic hydrogenation.

Example 10

12 grams of 2-[1'-phenyl-tridecyl-(1')]-N-methyl-piperidine obtained as described in Example 2 are dissolved in 60 cc. of ethyl acetate and quaternated with 10 grams of methyl bromide in a tube. The bromomethylate of 2-[1'-phenyl-tridecyl-(1')]-N-methyl-piperidine of the formula

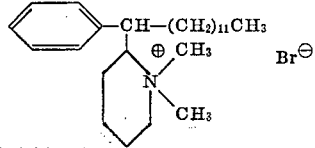

melts at 164–165° C.

Example 11

In a manner analogous to that described in Example 10 there is obtained with 12 grams of methyl chloride the corresponding chloromethylate of 2-[1'-phenyl-tridecyl-(1')]-N-methyl-piperidine of the formula

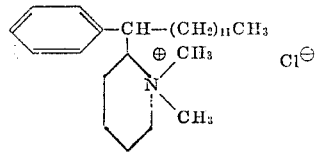

in the form of soapy, hygroscopic crystals.

Example 12

85 parts by weight of 2-[1'-phenyl-tridecyl-(1')]-N-methyl-piperidine-iodomethylate are mixed with 15 parts by weight of starch, if desired, with the addition of an agent accelerating dissolution in water, and the mixture is compressed into tablets, which are useful as disinfecting or preserving agents.

Example 13

5 parts by weight of 2-[1'-phenyl-tridecyl-(1')]-N-methyl-piperidine iodomethylate are mixed with 95 parts by weight of a finely powdered diluent, such as bole, boric acid, urea, cork meal or the like. The resulting mixture is a useful sprinkling powder for disinfecting purposes.

Example 14

10 parts by weight of 2-[1'-phenyl-tridecyl-(1')]-N-methyl-piperidine-iodomethylate are dissolved in water and the solution is made up to 100 parts by weight with water. The resulting solution is useful as a disinfecting agent.

Example 15

1 part by weight of 2-[1'-phenyl-tridecyl-(1')]-N-methyl-piperidine-iodomethylate is dissolved in a salve base consisting of 65 parts by weight of white petroleum jelly, 20 parts by weight of paraffin oil, 10 parts by weight of wool fat and 4 parts by weight of water, while gently heating the mixture on a water bath. The mixture is allowed to cool slowly, while being continuously stirred. In this manner there is obtained a salve having a good disinfecting action.

What is claimed is:

1. A member of the group consisting of alkyl piperidine compounds of the formula:

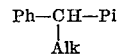

in which Ph stands for a member of the group consisting of phenyl, halogeno-phenyl, lower alkyl-phenyl, hydroxyphenyl, nitro-phenyl and amino-phenyl, Pi represents 1-R-piperidyl, in which R stands for a member of the group consisting of hydrogen, lower alkyl, hydroxy-lower alkyl, halogeno-lower alkyl, N,N-di-lower alkyl-amino-lower alkyl, piperidino, pyrrolidino and morpholino, and Alk represents an alkyl group containing at least ten carbon atoms, therapeutically useful acid addition salts, and quaternary lower alkyl ammonium compounds, in which the anion is selected from the group consisting of a halogen atom, a sulfuric acid radical and a sulfonic acid radical.

2. Compounds of the formula

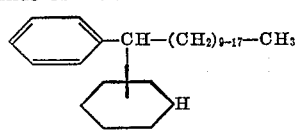

3. Compounds of the formula

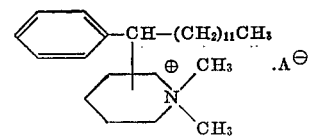

in which A⊖ stands for the anion of a halogen atom.

4. 2-[1'-phenyl-tridecyl-(1')]-piperidine.

5. The iodomethylate of 2-[1'-phenyl-tridecyl-(1')]-N-methyl-piperidine.

6. 2-[1'-phenyl-tridecyl-(1')]-N - (β - dimethylaminoethyl)-piperidine.

7. Therapeutically useful acid addition salts of the compound of claim 6.

8. Quaternary lower alkyl ammonium compounds of the compound of claim 6, in which the anion is selected from the group consisting of a halogen atom, a sulfuric acid radical and a sulfonic acid radical.

9. 4-[1'-phenyl-undecyl-(1')]-N - methyl - piperidine-iodomethylate.

References Cited in the file of this patent

UNITED STATES PATENTS

| | | |
|---|---|---|
| 2,739,968 | Sperber et al. | Mar. 27, 1956 |
| 2,830,057 | Hoffmann et al. | Apr. 8, 1958 |

FOREIGN PATENTS

| | | |
|---|---|---|
| 331,062 | Switzerland | Aug. 15, 1958 |

OTHER REFERENCES

Jour. Am. Chem. Soc. (Harris et al.), vol. 73, pp. 3959–65 (1951).

Chemical Abstracts, vol. 50, p. 9415(b) (1956), citing Sury et al., Helv. Chim. Acta, vol. 38, pp. 728–37 (1955).

---

UNITED STATES PATENT OFFICE

CERTIFICATION OF CORRECTION

Patent No. 2,962,500  November 29, 1960

Karl Hoffmann et al.

It is hereby certified that error appears in the above numbered patent requiring correction and that the said Letters Patent should read as corrected below.

Column 5, first table in Example 6, second column thereof, line 1, for "(1.1 mm.)" read -- (0.1 mm.) --; same column 5, second table in Example 6, first column thereof, line 3, after "-N-" insert -- methyl- --; column 6, in the third table, first column thereof, line 3, for "-(1')[-N-" read -- -(1')]-N- --; column 8, lines 56 to 58, the lower portion of the formula should appear as shown below instead of as in the patent:

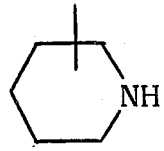

Signed and sealed this 8th day of August 1961.

(SEAL)
Attest:

ERNEST W. SWIDER
Attesting Officer

DAVID L. LADD
Commissioner of Patents

UNITED STATES PATENT OFFICE
CERTIFICATION OF CORRECTION

Patent No. 2,962,500                      November 29, 1960

Karl Hoffmann et al.

It is hereby certified that error appears in the above numbered patent requiring correction and that the said Letters Patent should read as corrected below.

Column 5, first table in Example 6, second column thereof, line 1, for "(1.1 mm.)" read -- (0.1 mm.) --; same column 5, second table in Example 6, first column thereof, line 3, after "-N-" insert -- methyl- --; column 6, in the third table, first column thereof, line 3, for "-(1')[-N-" read -- -(1')]-N- --; column 8, lines 56 to 58, the lower portion of the formula should appear as shown below instead of as in the patent:

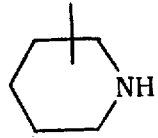

Signed and sealed this 8th day of August 1961.

(SEAL)
Attest:

ERNEST W. SWIDER
Attesting Officer

DAVID L. LADD
Commissioner of Patents